United States Patent
Burns

(10) Patent No.: US 9,073,515 B1
(45) Date of Patent: Jul. 7, 2015

(54) SYSTEM FOR REMOVING SNOW FROM A ROOF OF A VEHICLE

(71) Applicant: James A. Burns, Boston, MA (US)

(72) Inventor: James A. Burns, Boston, MA (US)

(*) Notice: Subject to any disclaimer, the term of this patent is extended or adjusted under 35 U.S.C. 154(b) by 0 days.

(21) Appl. No.: 14/200,374

(22) Filed: Mar. 7, 2014

(51) Int. Cl.
   *B60S 3/06* (2006.01)
   *B60S 3/00* (2006.01)

(52) U.S. Cl.
   CPC ... *B60S 3/066* (2013.01); *B60S 3/00* (2013.01)

(58) Field of Classification Search
   CPC ................ B60S 3/06; B60S 3/04; B60S 3/00; B60S 3/066
   See application file for complete search history.

(56) References Cited

U.S. PATENT DOCUMENTS

| | | | | |
|---|---|---|---|---|
| 5,989,356 A | * | 11/1999 | Candeletti | 134/6 |
| 6,477,730 B1 | * | 11/2002 | Marrero | 15/53.1 |
| 2012/0198636 A1 | * | 8/2012 | Edwards, III | 15/93.1 |

* cited by examiner

*Primary Examiner* — Shay Karls
(74) *Attorney, Agent, or Firm* — Lando & Anastasi LLP

(57) ABSTRACT

A system for removing snow and ice from a roof of a vehicle includes a piece of heavy equipment having at least one arm capable of raising and lowering, and a rotating brush assembly coupled to the at least one arm of the piece of heavy equipment to remove snow and ice from the roof of the vehicle. The rotating brush assembly includes a rotating brush, and a frame including a first portion configured to secure the rotating brush, and a second portion coupled to the first portion and configured to be secured to an apparatus capable of raising and lowering the frame. The first portion of the frame is configured to orient the rotating brush at an angle with respect of a direction of travel of the vehicle. A method of removing snow from a roof of a vehicle is further disclosed.

14 Claims, 7 Drawing Sheets

SYSTEM FOR REMOVING SNOW FROM A ROOF OF A VEHICLE

BACKGROUND OF DISCLOSURE

1. Field of Disclosure

Embodiments of the disclosure relate generally to systems and methods of removing snow and ice from a roof of a vehicle, such as a tractor trailer.

2. Discussion of Related Art

Snow and ice has a tendency to build up on surfaces of larger vehicles having raised, flat roofs, such as trucks, tractor trailers, buses, and the like. As a result, it is difficult to remove the snow and ice from the roofs of such vehicles. Various systems exist for removing snow from a roof of a vehicle, such as a tractor trailer. Reference can be made to U.S. Pat. No. 5,989,356 and U.S. Patent Application Publication No. 2012/0198636 A1 for examples of such systems. Existing systems often include dedicated height adjusters to adjust a height of snow removal apparatus to accommodate vehicles having varying roof heights. Such height adjusters are complex in design and expensive to manufacture and purchase.

SUMMARY OF DISCLOSURE

One aspect of the disclosure is directed to a system for removing snow and ice from a roof of a vehicle. In one embodiment, the system comprises a piece of heavy equipment having at least one arm capable of raising and lowering, and a rotating brush assembly coupled to the at least one arm of the piece of heavy equipment to remove snow and ice from the roof of the vehicle.

Embodiments of the system further may include a spray assembly secured to the second portion of the frame and configured to spray the rotating brush during operation of the rotating brush. The system further may include a path on which the vehicle travels underneath the rotating brush assembly. The system further may include a production area adjacent the path on one side of the path and a snow removal area adjacent the path on an opposite side of the path, the production area being configured to have the piece of equipment disposed thereon. The system further may include at least one speed bump provided on the path to agitate snow and ice on the roof of the tractor trailer. The rotating brush assembly may include a rotating brush and a frame configured to support the rotating brush. The frame may include a first portion configured to secure the rotating brush to the frame, and a second portion coupled to the first portion and configured to be secured to a piece of equipment capable of raising and lowering the frame. The first portion of the frame may be configured to orient the rotating brush at an angle with respect of a direction of travel of the vehicle. The second portion of the frame may include a mounting assembly configured to be secured to the at least one arm of the piece of equipment. The first portion of the frame further may include a connector capable of placing and orienting the rotating brush at a sixty degree angle with respect to the direction of travel of the vehicle when the rotating brush assembly removes snow and ice from the roof of the vehicle.

Another aspect of the disclosure is directed to a method of removing snow from a roof of a vehicle. In one embodiment, the method comprises: positioning a rotating brush assembly at a desired elevation and at a desired angle with respect to a predetermined path; and moving the vehicle along the path to remove snow and ice from the roof of the vehicle.

Embodiments of the method further may include depositing snow and ice removed from the roof of the vehicle to a snow removal area adjacent to the path. The method further may include removing snow and ice deposited in the snow removal area with another piece of equipment. Positioning the rotating brush assembly further may include manipulating a piece of equipment within a production area adjacent to the path, the piece of equipment having the rotating brush assembly mounted thereon.

A further aspect of the disclosure is directed to a rotating brush assembly for removing snow and ice from a roof of a vehicle. In one embodiment, the rotating brush assembly comprises a rotating brush, and a frame including a first portion configured to secure the rotating brush, and a second portion coupled to the first portion and configured to be secured to an apparatus capable of raising and lowering the frame. The first portion of the frame is configured to orient the rotating brush at an angle with respect of a direction of travel of the vehicle.

Embodiments of the rotating brush assembly further may include a spray assembly secured to the second portion of the frame and configured to spray the rotating brush during operation of the rotating brush. The spray assembly may include a container to contain fluid and a nozzle in fluid communication with the container and configured to spray the rotating brush. The first portion of the frame may include a U-shaped body having outwardly projecting legs, each leg being configured to support a bearing and an end of the shaft. The second portion of the frame may include a mounting assembly configured to be secured to the apparatus. The first portion of the frame further may include a connector capable of orienting the rotating brush at an angle with respect to the direction of travel of the vehicle when the rotating brush assembly removes snow and ice from the roof of the vehicle.

Yet another aspect of the present disclosure is directed to a rotating brush assembly for removing snow and ice from a roof of a vehicle. In one embodiment, the rotating brush assembly comprises a rotating brush, a frame configured to support the rotating brush and raise the rotating brush to a desired elevation, and a spray assembly secured to the frame and configured to spray the rotating brush during operation of the rotating brush.

The frame may include a first portion configured to secure the rotating brush, and a second portion coupled to the first portion and configured to be secured to an apparatus capable of raising and lowering the frame. The first portion may extend from the second portion at an angle with respect of a direction of travel of the vehicle when the rotating brush assembly removes snow and ice from the roof of the vehicle. The spray assembly may include a container to contain fluid and a nozzle in fluid communication with the container and configured to spray the rotating brush.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
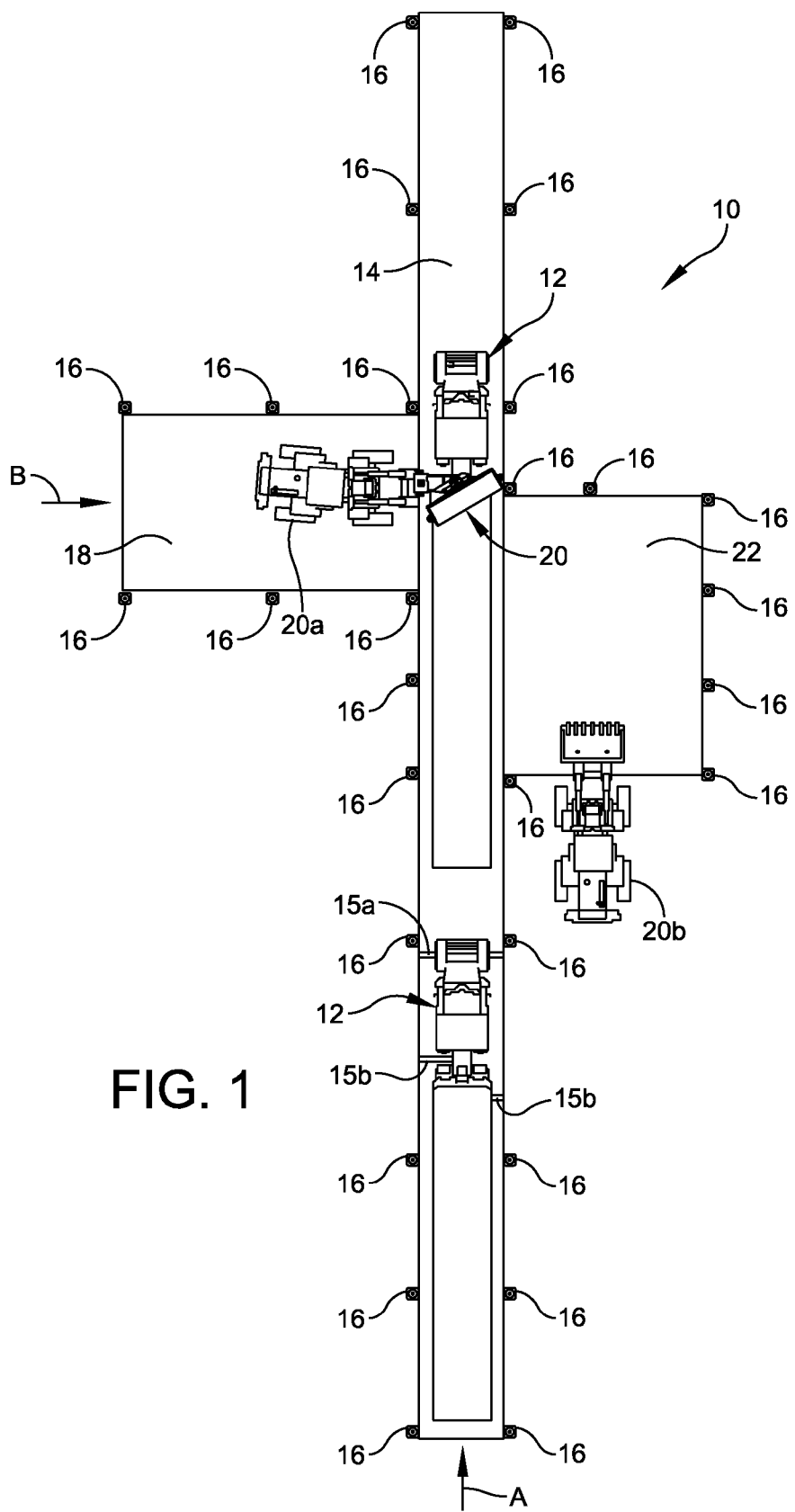
FIG. 1 is a top plan view of a system for removing snow and ice from a roof of a tractor trailer.

This disclosure is not limited in its application to the details of construction and the arrangement of components set forth in the following description or illustrated in the drawings. The principles set forth in this disclosure are capable of being provided in other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Embodiments of the present disclosure are directed to systems and methods for removing snow and ice from roofs of tractor trailers or other similar vehicles. The systems and methods disclosed herein take advantage of commonly available heavy equipment to adjust a height of an apparatus that is designed to remove snow and ice from the roofs of the tractor trailers. Although the system and method shown and described herein is particularly suited for removing snow and ice from the roofs of tractor trailers, it should be understood that the system and method may be used on other types of vehicles, such as trucks, vans, school buses, and other similar types of vehicles having elevated roofs.

Referring to the drawings, and more specifically to FIG. 1, a system for removing snow from a roof of a tractor trailer is generally indicated at 10. As shown in FIG. 1, there are two tractor trailers, each generally indicated at 12, which may have roof heights that are different from one another. Thus, it is necessary that the system 10 be able to vary the heights at which the system operates so as to effectively remove snow and ice from the roofs of the tractor trailers 12. The tractor trailers 12 are aligned to travel over a predetermined pathway 14 that is defined by safety cones, each indicated at 16, which are spaced-apart from one another predetermined distances. Although safety cones 16 are shown and described any suitable marker may be used to define the pathway 14. In one embodiment, the pathway 14 is twelve feet wide by two hundred and ten feet long. In a certain embodiment, a staging area may be located in front of the pathway 14 so that tractor trailers 12 and other types of vehicles may be organized and aligned prior to traveling down the pathway for snow removal. The system 10 is designed so that the tractor trailers 12 travel along the pathway 14 in a systematic manner to help ensure efficient removal of snow and ice from the roofs of the tractor trailers. The staging area may be of a suitable size to accommodate multiple tractor trailers 12 requiring snow removal.

The system 10 further includes two areas positioned adjacent to the pathway 14. As shown, a production area 18 is provided near the end of the pathway 14 on the left-hand side of the pathway as shown in FIG. 1. In one embodiment, the production area 18 may be forty-five feet wide by twenty-five feet long, and also may be defined by using safety cones 16, although other markers also may be used. The production area 18 is suitably sized to enable a first piece of mobile heavy equipment 20a, such as a front-end loader, to maneuver within the production area, and may be increased or decreased based on use and landscape constraints. The purpose of the production area 18 will become apparent as the description of the system 10 further proceeds. The system 10 further includes a snow removal area 22, which, in one embodiment, may be thirty feet wide by forty feet long, and also may be defined by using safety cones 16, although other markers also may be used. The snow removal area 22 is provided as an area for receiving snow and ice that is removed from the roofs of the tractor trailers 12, and may be increased or decreased depending on the amount of snow being removed or the constraints of the landscape. As shown, another piece of heavy equipment 20b, such as another front-end loader, may be employed to remove the snow deposited in the snow removal area 22. In one embodiment, the front-end loader 20b may be used to remove snow from the snow removal area and place the snow in a suitable carrier vehicle, such as a dump truck, to carry the snow to a remote location.

The arrangement is such that tractor trailers 12, which may be positioned within the staging area positioned prior to the pathway 14, travel along the pathway to remove snow and ice from the roofs of the tractor trailers by the first piece of heavy equipment 20a in the manner described below. In one embodiment, the first piece of heavy equipment 20a, which as mentioned above may embody a front-end loader, has a pair of arms, each indicated at 24, that are capable of raising and lowering a rotating brush assembly generally indicated at 26 that is secured to the arms.

Figure 2:
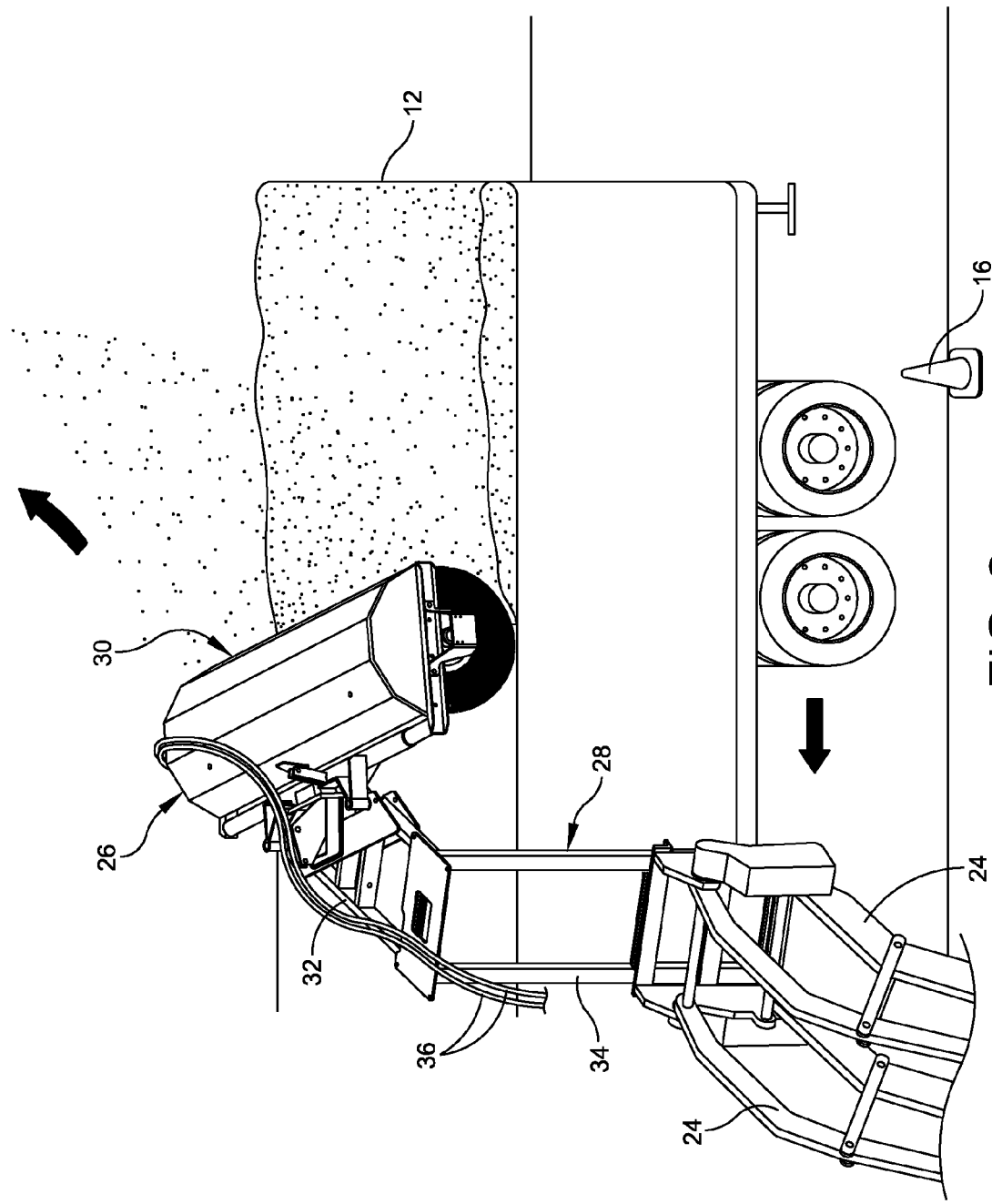
FIG. 2 is a perspective view of a rotating brush assembly of the system.

Referring additionally to FIG. 2, the first piece of heavy equipment 20a is positioned near the end of the pathway 14 in the production area 18, and elevates the rotating brush assembly 26 to a selected height that is suitable to remove snow and ice from the roof of the tractor trailer 12 traveling under the rotating brush assembly. The rotating brush assembly 26 is oriented in such a manner that it is horizontal and elevated just above the roof of the tractor trailer 12. The rotating brush assembly 26 further is oriented at an angle with respect to an axis A defined by the pathway 14. In one embodiment, the rotating brush assembly 26 is at a sixty degree angle with respect to axis A.

The positioning of the rotating brush assembly 26 at an angle with respect to the direction of the pathway 14 along axis A removes the snow and ice from the roof of the tractor trailer 12 in a direction towards the snow removal area 22. The manner in which the rotatable brush assembly 26 is secured to the first piece of heavy equipment 20a will be described in greater detail below. As shown, the tractor trailer 12 moves along the pathway 14 under the rotating brush assembly 26 to remove the snow. However, the first piece of heavy equipment 20a may be moved along the side of the tractor trailer 12 to remove snow from the roof of the tractor trailer.

The pathway 14 may be provided with a speed bump 15a, which extends across the pathway prior to where snow is removed from the roof the tractor trailer 12. Two additional speed bumps, each indicated at 15b, which extend part or halfway across the pathway, one from one side of the pathway and the other from the other side of the pathway. The two additional speed bumps 15b are positioned prior to speed bumps 15a as the tractor trailer 12 travels on the pathway 14. The speed bumps 15a, 15b are provided to agitate and loosen snow and ice formed on the roof of the tractor trailer 12. The result of this is that the rotating brush assembly 26 more effectively removes snow from the roof of the tractor trailer 12 since the snow and ice are in a better condition for removal. Although FIG. 1 illustrates an alternating pattern of speed bumps 15b positioned in front of the speed bump 15a that extends across the pathway 14, any pattern of speed bumps may be used and still fall within the scope of the present disclosure. Moreover, the sizes and shapes of the speed bumps 15*a*, 15*b* may be modified to more effectively loosen snow and ice from the roof of the tractor trailer 12.

Figure 3:
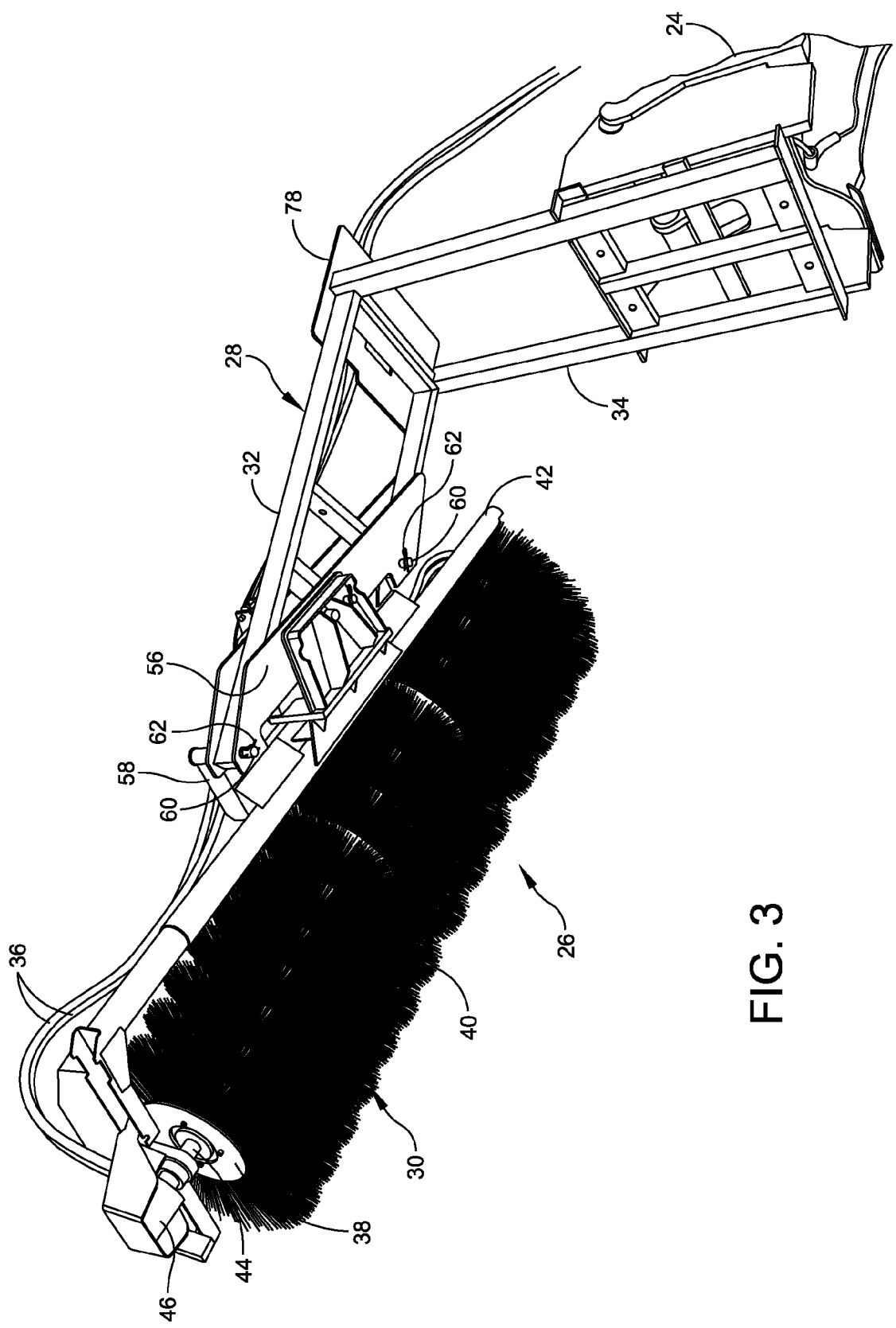
FIG. 3 is a another perspective view of the rotating brush assembly.
Figure 4:
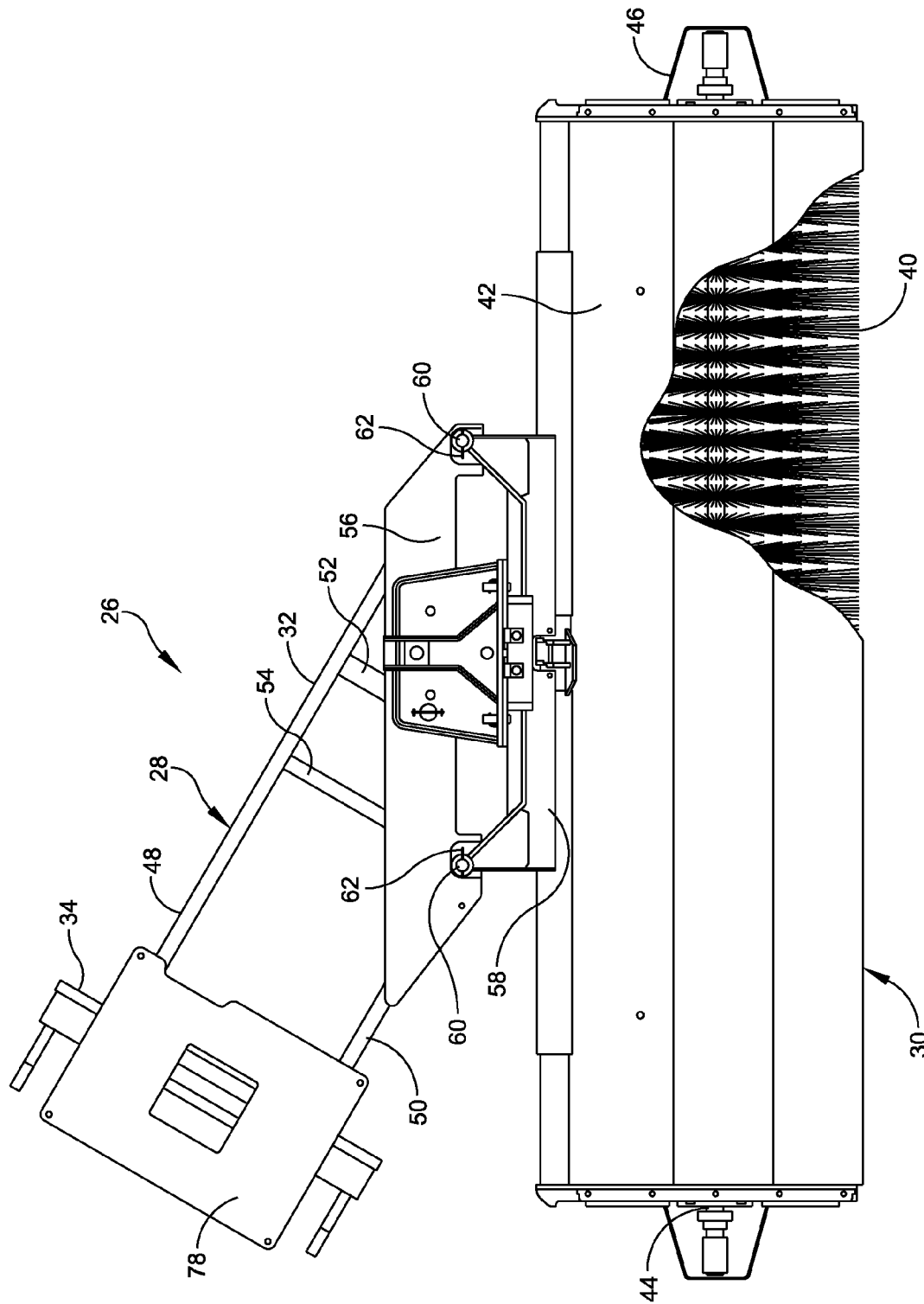
FIG. 4 is a top plan view of the rotating brush assembly.

Referring to FIGS. 3 and 4, the rotating brush assembly 26 will be described in greater detail. In one embodiment, the rotating brush assembly 26 includes a frame, generally indicated at 28, which is configured to be secured to the piece of heavy equipment 20*a*, and a rotating brush, generally indicated at 30, which is secured to the frame. In a certain embodiment, the frame 28 is fabricated from steel, and includes a first portion 32 configured to secure the rotating brush 30, and a second portion 34 coupled to the first portion and configured to be secured to the first piece of heavy equipment 20*a*. As shown, the frame 28 is generally L-shaped in construction, with the first portion 32 extending generally perpendicularly from the second portion 34. The first portion 32 may extend at a desired angle from the second portion 34 so long as the rotating brush 30 is extended from the piece of heavy equipment 20*a* a suitable distance away from and above the piece of heavy equipment. As shown, the frame 28 is constructed to elevate and position the rotating brush assembly 26 so that the rotating brush assembly extends above and completely spans a width of the roof of the tractor trailer 12.

With reference back to FIG. 1, the arrangement is such that the piece of heavy equipment 20*a* is moved along an axis B that is generally perpendicular to the pathway 14, and the frame 28 extends the rotating brush 30 above the roof of the tractor trailer 12 so that the rotating brush is oriented at an angle with respect to the axis A of the pathway. During operation, the rotating brush 30 of the rotating brush assembly 26 is configured to remove the snow from the roof of the tractor trailer 12 in a direction toward the snow removal area 22 on an opposite side of the tractor trailer.

Figure 5:
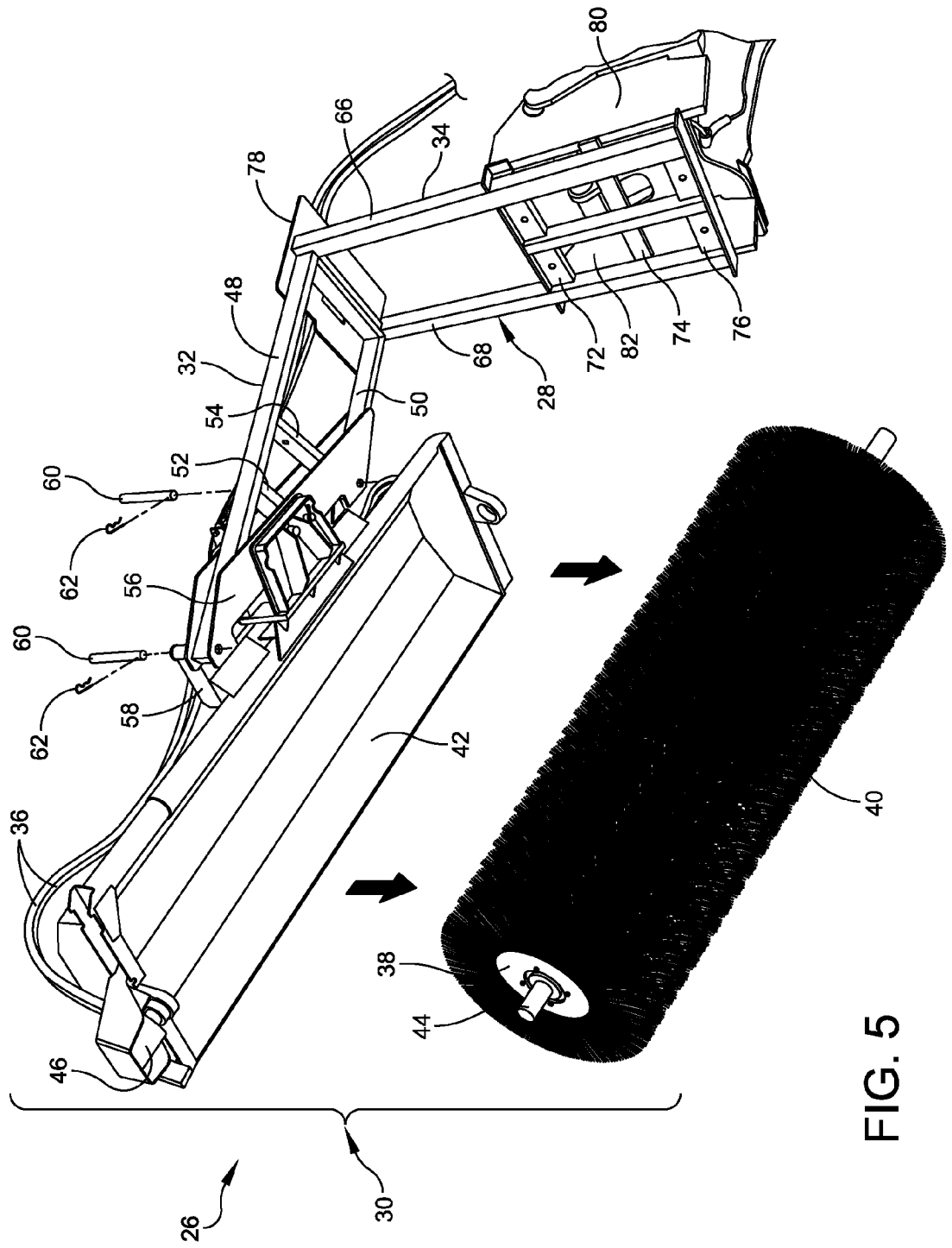
FIG. 5 is an exploded perspective view of the rotating brush assembly shown in FIG. 4.

Referring to FIG. 5, the rotating brush 30 of the rotating brush assembly 26 may be a large hydraulic broom or sweeper, which can be purchased as a complete assembly. In one embodiment, the rotating brush 30 may be purchased from M-B Companies, Inc. of Chilton, Wis., under model no. AHA 02165, with one TKH/10/P/2/S/H/B/N/N/N/MaRB 416 coupler. The first portion 32 of the frame 28 is configured to be secured to the rotating brush 30 to orient the rotating brush at an angle with respect of a direction of travel of the tractor trailer 12 as described. The rotating brush 30 of the rotating brush assembly 26 includes hydraulic lines, each indicated at 36, that are configured to be fluidly coupled to hydraulic lines of the first piece of heavy equipment 20*a*. In one embodiment, the rotating brush 30 of the rotating brush assembly 26 can embody an auger brush having a rotating drum 38 that has a plurality of bristles 40 securely mounted on the drum in a desired pattern. The bristles 40 can be arranged in circumferential rows on the drum 38, although other patterns including spiral or staggered stripes, or a simple, random or patterned spacing of the groups of bristles can be used. The bristles 40 can be made of plastic or plastic coated metal similar to those used on street sweepers, so that they can dislodge and remove snow without damaging the roof of the tractor trailer 12.

Still referring to FIG. 5, the rotating brush 30 of the rotating brush assembly 26 may include a curved steel housing 42 that is placed above the drum 38 and functions as a support structure for the drum. As shown, the housing 42 extends partially around a circumference of the drum 38. The drum 38 can be rotatably mounted on a shaft 44, which is driven by a motor 46 when assembled to the housing. The motor 46 is configured to rotate the shaft 44 and the drum 38 to enable the bristles 40 to contact and move snow from the roof of the tractor trailer 12. Suitable hydraulic controls are provided to control the operation of the rotating brush 30. The hydraulic controls may be provided in the first piece of heavy equipment 20*a* in which the operator can control the operation of the rotating brush 30.

Figure 6:
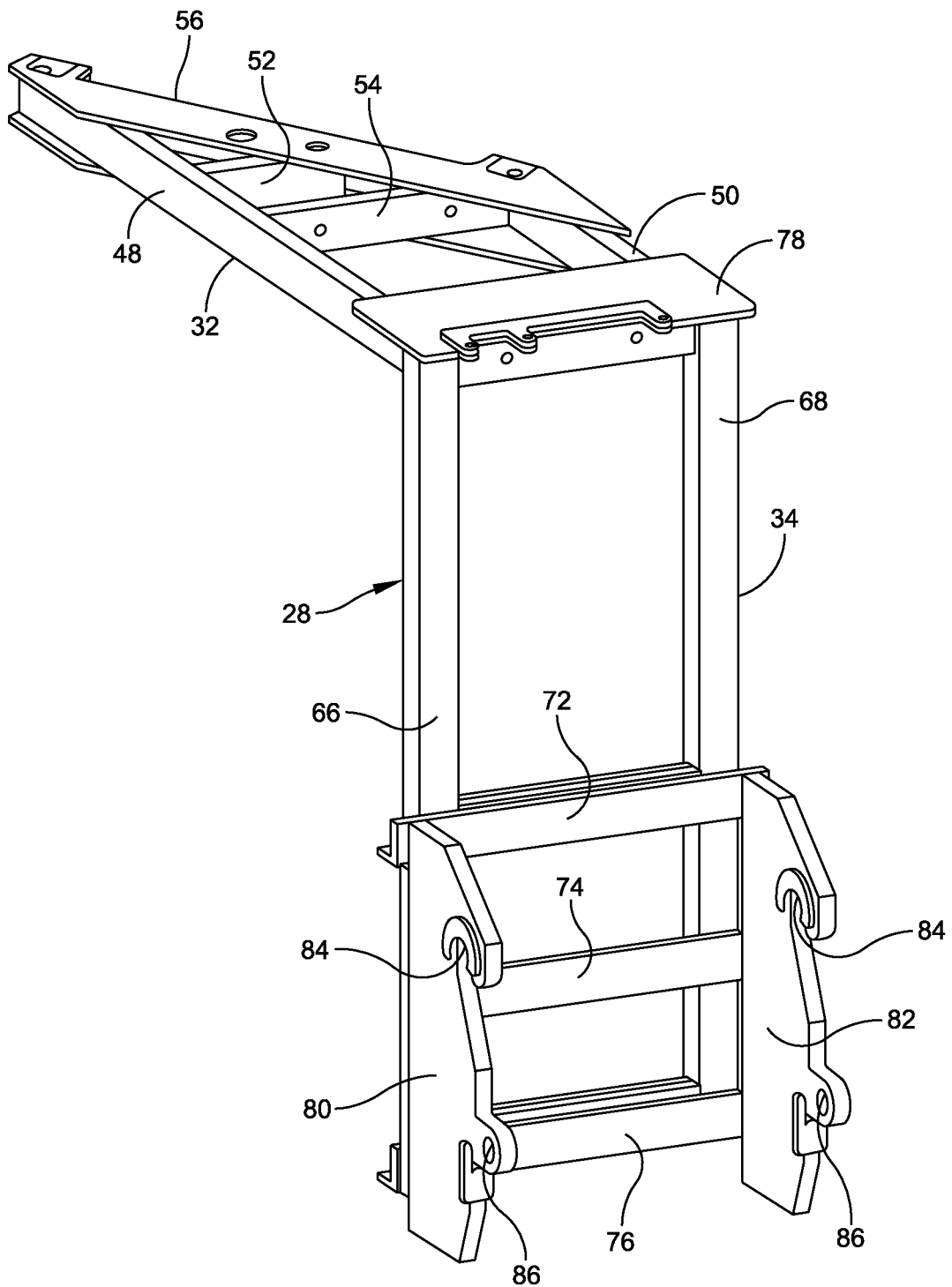
FIG. 6 is a perspective view of a frame of the rotating brush assembly, which enables the rotating brush assembly to extend above the roof of the tractor trailer.

As shown, with additional reference to FIG. 6, the first portion 32 of the frame 28 of the rotating brush assembly 26 includes two rail members 48, 50, two cross members 52, 54, and a connector 56 provided at the end of the rail members. The connector 56 is configured to be secured to a mating connector 58 associated with the rotating brush 30. The cross members 52, 54 are provided to provide lateral support to the rail members 48, 50. As shown, the connector 56 is disposed at an angle with respect to axes associated with the rail members 48, 50. In a certain embodiment, the connector 56 is disposed at a sixty degree angle with respect to the axes associated with the rail members 48, 50. It should be understood that the connector 56 may be secured to the rail members 48, 50 at any desirable angle with respect to the rail members. The rail members 48, 50, the cross members 52, 54 and the connector 56 are suitably welded to one another to provide the requisite strength needed to support the rotating brush 30. In alternate embodiments, the connector may be configured to be adjustable with respect to the rail members to adjust the angle at which the connector extends from the rail members. The arrangement is such that the rotating brush 30 is secured to the frame 28 by a pair of rods or pins, each indicated at 60, which are secured in place by cotter pins, each indicated at 62, which are best illustrated in FIGS. 4 and 5. Specifically, openings are formed in the mating connector 58 of the housing 42 of the rotating brush 30 and corresponding openings are formed in the connector 56 of the first portion 32 of the frame 28, which, when aligned with one another, are configured to receive the rods 60 therein. The cotter pins 62 are used to secure the rods 60 in place. It should be understood that the rotating brush 30 may be secured to the frame 28 in any suitable manner.

As shown, the second portion 34 of the frame 28 includes a mounting assembly configured to be secured to the piece of heavy equipment 20*a*, e.g., a front-end loader. In one embodiment, the second portion has a length so that when extended, the loader can raise the rotating brush assembly to a height of fourteen or more feet. As shown, the second portion 34 of the frame 28 includes two vertical rail members 66, 68 and four cross members 70, 72, 74, 76 to provide lateral support to the rail members 66, 68. The rail members 66, 68 and the upper most cross member 70 are suitably welded to the rail members 48, 50 of the first portion 32 of the frame 28 to provide a strong connection. As shown in FIG. 6, a plate 78, which is secured, e.g., by welding, to the butt ends of the rail members 66, 68 and the rail members 48, 50, is further provided to provide structural stability. The second portion 34 of the frame 28 further includes a pair of connectors 80, 82, each connector having a hook 84 and an opening 86 formed in the connector to secure the second portion to the arms 24 of the first piece of heavy equipment 20*a* in the well-known manner. Once the rotating brush assembly 26 is secured to the first piece of heavy equipment 20*a*, the hydraulic lines 36 associated with the rotating brush assembly and the first piece of heavy equipment can be connected to provide the hydraulic control of the rotating brush 30 of the rotating brush assembly by the first piece of heavy equipment.

Figure 7:
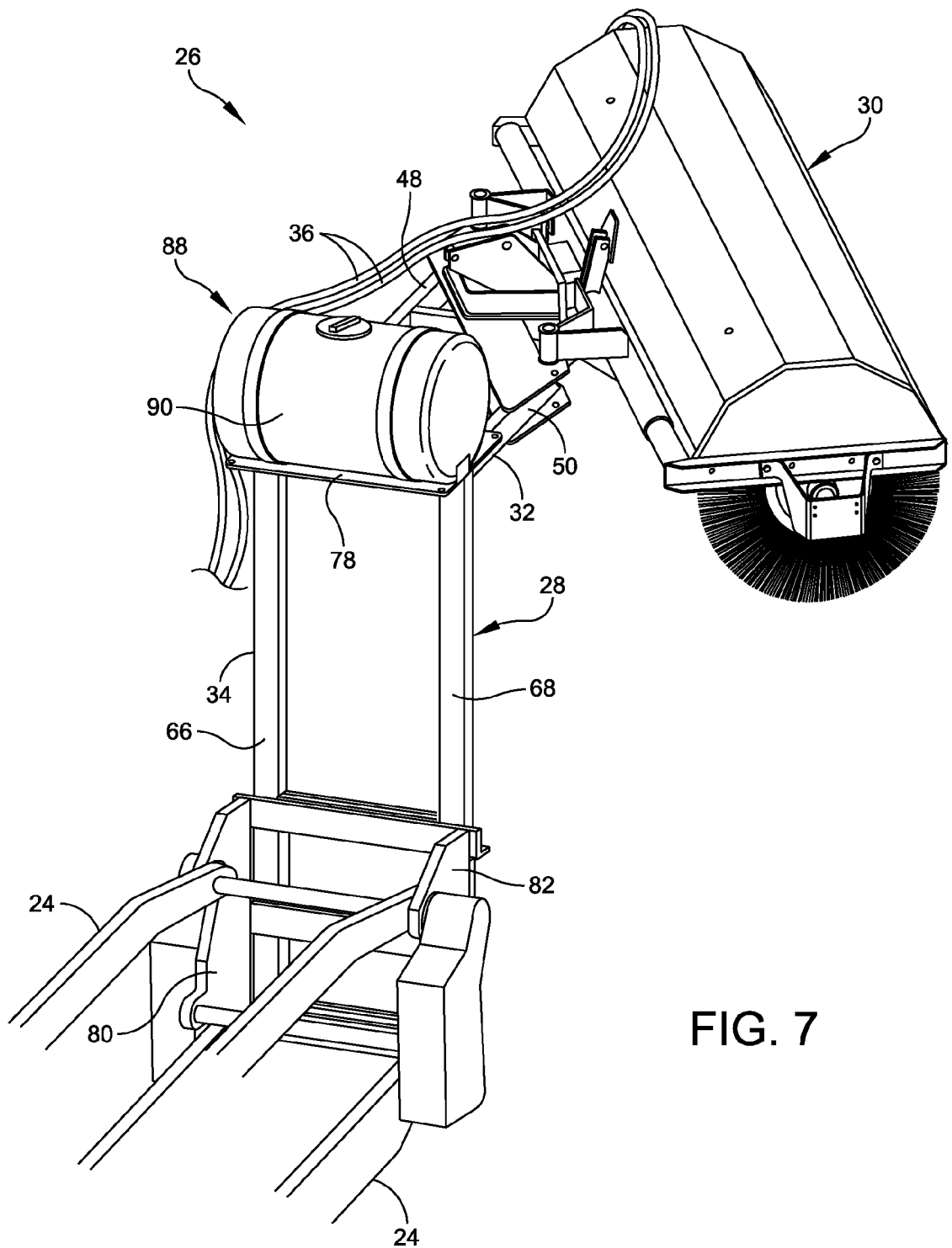
FIG. 7 is a perspective view of a rotating brush assembly of another embodiment including a spray assembly secured to the frame to spray a rotating brush of the rotating brush assembly during operation.

Referring to FIG. 7, the rotating brush assembly 26 further may be configured to include a spray assembly, generally indicated at 88, secured to the second portion 34 of the frame 28. The spray assembly 88 is designed to spray the rotating brush 30 during operation of the rotating brush to reduce additional accumulation that may occur after the rotating brush removes the existing snow from the given surface, and further mitigates the risk of a subsequent bond of ice forming on the given surface after the brush operation, thus more effectively removing snow from the roof of the tractor trailer 12 during operation. In one embodiment, the spray assembly 88 includes a large container 90 that is suitably secured to the plate 78 of the frame 28. The container 90 is in fluid communication with the drum 38 of the rotating brush 30, with the drum being configured with a series of openings to enable a noncorrosive melting agent or another suitable fluid contained in the container to wet the bristles 40 during operation of the rotating brush. The spray assembly 88 is also suitably controlled by an electrical motor powered by and connected to loader 20a during operation.

A method of removing snow from a roof of a vehicle, such as the tractor trailer 12, is further disclosed. In one embodiment, the method includes positioning the rotating brush assembly 26 at a desired elevation and at a desired angle with respect to a predetermined pathway 14. In the shown embodiment, the first piece of heavy equipment 20a, e.g., the front-end loader, may be used to position the rotating brush assembly 26, with the front-end loader being positioned in the production area 18 so that the front-end loader is facing in the direction (along axis B) that is perpendicular to the direction of the pathway 14 (along axis A).

The method further includes moving the tractor trailer 12 along the pathway 14 to remove snow from the roof of the tractor trailer. As mentioned above, the method may be performed by moving the front-end loader 20a, although this approach is less desirable. When positioning the rotating brush assembly 26, the frame 28 of the rotating brush assembly orients the rotating brush 30 at an angle with respect to the axis A defined by the pathway 14. In one embodiment, the angle is sixty degrees.

In a particular embodiment, the method further includes depositing snow removed from the roof of the tractor trailer 12 to a snow removal area 22 adjacent to the pathway 14 with the rotating brush assembly 26. The snow deposited in the snow removal area 22 is removed by another piece of heavy equipment 20b, such as another front-end loader, which is configured to deposit the snow in a dump truck.

The method of snow removal can also include a number of operational considerations. In one embodiment, the outside area of a facility suitable for snow removal is reviewed and discussed to determine the best staging location for the operation. There are several factors to consider, including facility traffic flow, tractor trailer parking, employee parking, safety zone requirements, and snow storage from operations. The staging area for operation should be flat, free of obstructions, and free of vehicle and pedestrian traffic. In certain embodiments, tractor trailer drivers may be provided placards and subjected to a training video, which provides a brief summary of the operation.

A snow response plan may be drafted, which outlines the communication protocol, procedures, such as start times, hours of operation, amount of accumulation that would trigger the service, and any other facility-specific information. The document also can detail the communication contact information of the facility's operations manager and the snow removal operators.

Once the staging area is established, a coned-off one way traffic lane or pathway, perpendicular to the production area, is established using approximately six safety cones immediately prior to the operation. Additional safety cones may be used to designate the staging area for vehicles to line up. This will define the approach to the pathway for tractor trailer drivers. Within the defined approach pathway, temporary speed bumps are placed diagonally across the width of the approach lane so that as the tractor trailer travels over each speed bump, the movement created by the speed bump causes a break between a potential ice bond on the surface of the trailer and a base of the snow layer. This movement will also loosen snow base layer prior to the operation.

The operator of the loader with rotating brush assembly can wait in a loader waiting area, which is located next to the production area. Next, the operator of the loader moves into the production area prior to the start of the operation. This is the area in which the loader will move forward when the tractor trailer moves into position within the production area, which can also be referred to as an operating zone. After completing the snow clearing with the rotating brush assembly, the loader operator will back the loader within the production area away from the pathway to await the next tractor trailer for clearing. As described, the production area is perpendicular to the coned-off traffic pathway, located on the opposite side of designated snow removal area.

In a certain embodiment, all activity within the coned-off approach pathway can be directed by a ground spotter ("spotter"). Among other things, the spotter directs a slow, straight approach within the coned-off pathway. The spotter can be clothed in a bright yellow safety vest, bright yellow or orange safety gloves, and eye protection. The spotter ensures that the tractor trailer enters and exits the coned-off pathway in a straight path. The spotter can verify that there are no obstructions protruding from the trailer, such as open rear doors. The spotter can signal the tractor trailer driver to stop at a designated location using highly visible stop/slow paddles mounted to a sixty-six-inch long handle. Once the tractor trailer has come to a complete stop at the designated location, the spotter signals the loader operator to approach from the loader waiting area to the production area located immediately perpendicular to the tractor trailer, from the driver's side.

The operator of the loader then moves into position for the snow removal operation. The loader operator places the rotating brush assembly over the entire width of the trailer beginning in the area immediately behind the cab. The loader operator then places the loader in neutral, places a parking brake on, then carefully lowers the rotating brush assembly to a level position until the point where the bristles of the rotating brush assembly are touching the top or roof of the trailer. As the loader operator lowers the rotating brush assembly, the spotter is mirroring the actual position of the rotating brush assembly with his free arm so that the loader operator knows that the brush is in fact level with the top of the trailer's roof. Alternatively, the loader operator can look at a monitor installed as an option inside the loader, in which the monitor is fed from images taken from a camera mounted to the rotating brush assembly. Once the rotating brush assembly is in position, the loader operator engages auxiliary hydraulics and begins to spin the rotating brush of the rotating brush assembly. When the maximum throttle is reached, the spotter signals the tractor trailer driver to begin a slow crawl forward (e.g., two miles per hour). As the tractor trailer pulls forward, the rotating brush assembly powerfully sweeps the existing snow from the top of the tractor trailer into the designated snow removal area.

The driver of the tractor trailer continues to be guided by the spotter as he drives forward and exits the coned-off area. The spotter ensures that the driver maintains a straight line departure from the pathway by signaling a parallel forward movement, and reminds the tractor trailer driver to maintain a slow speed while driving forward. Once the rotating brush assembly reaches the end of the trailer, the spotter signals to the tractor trailer driver (e.g., by a "thumbs up" signal) that clearing is complete and that the truck driver is free to go. The loader operator raises the rotating brush assembly, and returns into the designated loader waiting area to await the next tractor trailer. Once the loader is positioned within its designated loader waiting area, the next tractor trailer is signaled by the spotter to approach the production area, and directed to stop at the designated location. The loader operator then repeats operation as outlined above. During this time, the snow removal area is periodically cleared of snow. Occasionally, the production area will have to be cleared of snow. The speed bumps may need to be removed so that a plow truck or another piece of snow removal equipment can clear the area. The approach lane should be monitored so that any snow build up does not cause an unleveled surface within the approach lane.

Upon completion of operations, the cones and temporary speed bumps are removed and stored for future use. The area is cleared of any snow piles and a melting agent can be applied to the entire area.

The snow removal system has an optional package to enable the loader operator to disperse a melting agent (e.g., NC3000) to the trailer rooftop. This is an environmentally friendly noncorrosive-melting agent that can be applied to the tops of tractor trailers prior to a snowstorm, as well as, applied during service with the spray assembly. The melting agent prevents the bond between the top of the tractor trailer and the base of additional accumulated snow. As mentioned above, this option package includes a holding tank or container for the melting agent, which is easily installed on the rotating brush assembly, and sprayer nozzles to deliver the product.

As can be appreciated, a variety of conventional heavy equipment, each being capable of performing height adjustment, can be used to adjust a height of the rotating brush assembly. In the shown embodiment, the height of the rotating brush assembly is adjusted by moving arms of the loader upwardly and downwardly. The loader includes hydraulic components to achieve the movement of the arms and the rotating brush assembly.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A system for removing snow and ice from a roof of a vehicle, the system comprising:
   a piece of heavy equipment having at least one arm capable of raising and lowering; and
   a rotating brush assembly coupled to the at least one arm of the piece of heavy equipment to remove snow and ice from the roof of the vehicle, the rotating brush assembly including
      a rotating brush, and
      a frame configured to support the rotating brush, the frame including a first portion configured to secure the rotating brush to the frame, and a second portion fixedly secured to the first portion and configured to be secured to the at least one arm of the piece of heavy equipment, the first portion and the second portion of the frame being generally L-shaped in construction, with the first portion extending generally perpendicularly from the second portion, the first portion of the frame being configured to orient the rotating brush at approximately a sixty degree angle with respect of a direction of travel of the vehicle.

2. The system of claim 1, wherein the second portion of the frame includes a mounting assembly configured to be secured to the at least one arm of the piece of equipment.

3. The system of claim 1, wherein the first portion of the frame further includes a connector capable of placing and orienting the rotating brush at the sixty degree angle with respect to the direction of travel of the vehicle when the rotating brush assembly removes snow and ice from the roof of the vehicle.

4. The system of claim 1, further comprising a spray assembly secured to the second portion of the frame and configured to spray the rotating brush during operation of the rotating brush.

5. The system of claim 1, further comprising a path on which the vehicle travels underneath the rotating brush assembly.

6. The system of claim 5, further comprising a production area adjacent the path on one side of the path and a snow removal area adjacent the path on an opposite side of the path, the production area being configured to have the piece of equipment disposed thereon.

7. The system of claim 5, further comprising at least one speed bump provided on the path to agitate snow and ice on the roof of the tractor trailer.

8. A system for removing snow and ice from a roof of a vehicle, the system comprising:
   a front-end loader having at least one arm capable of raising and lowering; and
   a rotating brush assembly coupled to the at least one arm of the front-end loader to remove snow and ice from the roof of the vehicle, the rotating brush assembly including
      a rotating brush, and
      a frame configured to support the rotating brush, the frame including a first portion configured to secure the rotating brush to the frame, and a second portion fixedly secured to the first portion and configured to be secured to the at least one arm of the piece of the front-end loader, the first portion and the second portion of the frame being generally L-shaped in construction, with the first portion extending generally perpendicularly from the second portion, the first portion of the frame being configured to orient the rotating brush at an angle with respect of a direction of travel of the vehicle.

9. The system of claim 8, wherein the second portion of the frame includes a mounting assembly configured to be secured to the at least one arm of the front-end loader.

10. The system of claim 8, wherein the first portion of the frame further includes a connector capable of placing and orienting the rotating brush at a sixty degree angle with respect to the direction of travel of the vehicle when the rotating brush assembly removes snow and ice from the roof of the vehicle.

11. The system of claim 8, further comprising a spray assembly secured to the second portion of the frame and configured to spray the rotating brush during operation of the rotating brush.

12. The system of claim 8, further comprising a path on which the vehicle travels underneath the rotating brush assembly.

13. The system of claim 12, further comprising a production area adjacent the path on one side of the path and a snow removal area adjacent the path on an opposite side of the path, the production area being configured to have the front-end loader disposed thereon.

14. The system of claim 12, further comprising at least one speed bump provided on the path to agitate snow and ice on the roof of the tractor trailer.

\* \* \* \* \*